United States Patent [19]

Jones et al.

[11] 4,196,107

[45] Apr. 1, 1980

[54] SEMI-SOLID WATER-BASED COATING COMPOSITIONS

[75] Inventors: James E. Jones, Lower Burrell; Rodger G. Temple, Gibsonia; Jerome A. Seiner, Pittsburgh; Sharon L. Young, Butler; William G. Boberski, Gibsonia, all of Pa.

[73] Assignee: PPG Industries, Inc., Pittsburgh, Pa.

[21] Appl. No.: 912,807

[22] Filed: Jun. 5, 1978

[51] Int. Cl.² .................................................. C08L 1/28
[52] U.S. Cl. .......................... 260/17 R; 260/29.6 PT; 260/29.6 RW; 260/29.6 TA
[58] Field of Search ......................................... 260/17 R

[56] References Cited

U.S. PATENT DOCUMENTS

| Re. 28,957 | 9/1976 | Drelich | 427/331 |
|---|---|---|---|
| 3,280,050 | 10/1966 | Johnson et al. | 260/17 |
| 3,810,784 | 5/1974 | Wong et al. | 427/DIG. 5 |
| 3,928,676 | 12/1975 | Drelich | 427/341 |
| 3,993,510 | 11/1976 | Bellavin | 427/DIG. 5 |
| 4,097,430 | 6/1978 | Phillips | 260/17.4 ST |

FOREIGN PATENT DOCUMENTS

| 833583 | 4/1960 | United Kingdom | 260/17 |
|---|---|---|---|
| 1029723 | 5/1966 | United Kingdom | 260/17 |
| 1068715 | 5/1967 | United Kingdom | 260/17 |
| 1413126 | 11/1975 | United Kingdom | 260/29.6 R |
| 1430866 | 4/1976 | United Kingdom | 260/17 |

OTHER PUBLICATIONS

Chem. Absts., vol. 71:113692m, Thixotropic Polyurethane Compositions: Takeda.
Chem. Absts., vol. 82:126754k; Urethane Sealing Material, Fukuda.
Chem. Absts., vol. 74:91642c, Composition-Production Thixotropic Gels, Stancioff.
Chem. Absts., vol. 74:91646g, Improve-Gelling-Metal Compound-Kaspar.
Chem. Absts., vol. 71:102518h, Improving Stability of Thixotropic Epoxy Resin Compositions, Lippe et al.

*Primary Examiner*—Edward M. Woodberry
*Attorney, Agent, or Firm*—George D. Morris

[57] ABSTRACT

This invention relates to coating compositions which are "solid" prior to application, yet, which when applied to a substrate, flow and level in a manner similar to conventional coating compositions. The coating compositions of the invention comprise a gelled coating composition, capable of application and flow on a solid substrate comprising: (a) a water reducible polymer, (b) water, (c) an electrolyte, and (d) a colloidal gelling agent, gelable by interaction with the electrolyte, in an amount sufficient, when interacted with said electrolyte, to gel the composition to form a stable semisolid and to provide a composition reducible to a coating application viscosity upon the application of a relatively small shearing force at a relatively small shearing rate; which gelled coating composition, after being sheared to a coating application viscosity, does not recover substantial colloidal gelling agent contributed gel structure.

23 Claims, 1 Drawing Figure

SEMI-SOLID WATER-BASED COATING COMPOSITIONS

BACKGROUND OF THE INVENTION

One major criticism of conventional coating compositions is the mess attendant in their handling and application. First, typically, the coating composition must be stirred to redispersed the solids content, and then at least a portion of the coating composition is transfered to a pan adapted to a roller or pad applicator. Splashing, dripping or spilling, prior to and during the actual application of the coating composition to a substrate are always real dangers.

Prior attempts have been made in the art to provide "solid" coating compositions which could be applied in stick form either by manual or machine assisted application, the application shearing force fluidizing the coating composition. However, even in the best of these systems, the gelled, solid or semisolid composition was provided by the use of thixotropic agents, and, while shearing forces could temporarily provide a fluidized system, once the shearing force was removed, the thixotropic agents present once more began to restore the solid nature or gel structure to the system, thus hampering desirable flow and leveling of the applied coating compositions.

In addition, the use of a stick form product entails holding a heavy object up to the application point and increases arm weariness.

Contrary to the prior art systems, in the coating compositions of the invention, once the gel structure formed by the interaction of an electrolyte and a colloidal gelling agent is destroyed by the application of shearing forces, there is little or no recovery of a substantial gel structure contributed by the gelling system. Thus, the compositions of the invention act as conventional paints when coated upon a substrate, providing excellent flow and leveling.

SUMMARY OF THE INVENTION

This invention relates to coating compositions which are "solid" prior to application, yet, which when applied to a substrate, flow and level in a manner similar to conventional coating compositions. The coating compositions of the invention comprise a gelled coating composition, capable of application and flow on a solid substrate, comprising: (a) a water reducible polymer, (b) water, (c) an electrolyte, and (d) a colloidal gelling agent, gelable by interaction with the electrolyte, in an amount sufficient, when interacted with said electrolyte, to gel the composition to form a stable solid or semisolid and to provide a composition reducible to a coating application viscosity upon the application of a relatively small shearing force at a relatively small shearing rate; which gelled coating composition, after being sheared to a coating application viscosity, does not recover substantial colloidal gelling agent contributed gel structure.

DESCRIPTION OF THE INVENTION

The above summarized invention is described in more detail as follows:

Generally, the coating compositions of the invention are conventional water-based coating compositions containing, in addition to their conventional components, appropriate amounts of a gel forming system which is a combination of an electrolyte and colloidal gelling agent, gelable by interaction with said electrolyte. The conventional water-based coating compositions employed may be virtually any of the available compositions containing conventional materials, in their conventional proportions, such as, for example, water reducible film forming resins, solubilizers and/or emulsifiers, varying amounts of organic solvents and co-solvents, pigments, extenders, fillers, wetting agents, viscosity control agents, flow control agents, and the like.

It is noted that, to the extent that certain water reduced resins and/or other conventional ingredients are electrolytes, the presence of such materials may satisfy the dual functions of a conventional coating composition ingredient, e.g. a film former, and an electrolyte in the gel forming system.

The water reducible film forming polymers useful in the compositions of this invention include all such polymers known useful in such compositions to form a water-borne polymer system, for example, a solution, dispersion or emulsion.

The film forming polymer includes, but is not limited to, water-reducible inorganic and organic polymers, such as acrylic polymers, vinyl resins and chlorine substituted vinyl resins, polyphosphorylonitriles, polyethers, saturated and unsaturated polyesters, polyurethanes and polyepoxides as well as, natural resins or chemically modified natural resins. The resins which are addition polymers can be homopolymers or copolymers. The resins which are condensation polymers can be formed from any number of condensable reactants. Appropriate functional groups can be built into the polymer chain or grafted thereto. A mixture of more than one film forming polymer can be employed. The polymer employed may provide thermoplastic or thermosetting systems, curable, for example, by chemical means or radiation, at ambient or elevated temperatures.

It is noted that "film forming" is defined as the ability to form a film in the existing system, which may include solvents, co-solvents and/or plasticizers. Thus, polymers which are not inherently film forming without, for example, coalescing solvents and/or co-solvents are included within the scope of the film forming polymers which can be employed in the invention. Again, this represents conventional coatings technology.

The polymer is generally present in an amount conventionally used in coating compositions.

While not essential, the composition may contain one or more pigments, such as hiding pigments, extender pigments or coloring pigments. Examples of useful pigments include titanium dioxide, antimony oxide, zinc oxide, zirconium oxide, zinc sulfide and lithopone. Extender pigments include silica, barytes, calcium carbonate, talc, magnesium silicate and aluminum silicate.

In general, the pigment is used in an amount of 0 to 70 percent by weight of the total composition. The pigment can be present to provide pigment volume concentrations up to about 75 (i.e., 75% of the final dry film volume being pigment).

The electrolyte gelable colloid employed in the compositions of the invention can be virtually any coating composition compatible colloid which can be gelled by a paint compatible electrolyte. Typically, these colloids are aqueous dispersions of non-agglomerated millimicron sized particles having a surface charge and which are stabilized by a counter-ion. Such colloids may be anionic or cationic in nature.

A particularly useful group of colloids are colloidal silicas, usually with high $SiO_2/Na_2O$ ratios, where the particle surface is partially composed of silanol groups which are partially ionized and stabilized in the presence of sodium counter ions. Similar colloids are useful where the counter ion is, for example, potassium, lithium, ammonium, substituted ammonium and quaternary ammonium ions. Examples of such colloids are available under the tradenames Ludox, Nalcoag and Nyacol.

A number of useful aqueous colloidal silica sols are set forth in Table 1.

| -continued | |
|---|---|
| Weight per gallon (25° C., 77° F.), lb. | 10.2 |
| Specific Gravity (25° C., 77° F.) | 1.23 |

In addition to silica sols, other sols which are electrolyte gelable include $As_2S_3$ sols, $Fe_2O_3$ sols, $Al_2O_3$ sols, AgI sols, $Sb_2O_3$ sols and the like.

An example of a useful colloidal alumina (Baymal) is a free flowing powder consisting of clusters of minute fibrils of boehmite (AlOOH) alumina. The powder dis-

TABLE 1

| | 1 | 2 | 3 | 4 | 5 | 6[4] | 7 | 8 |
|---|---|---|---|---|---|---|---|---|
| Stabilizing Counter-Ion | Na | Na | Na | Na | Na | Na | Ammonium | Na |
| Particle Charge | Negative | Negative | Negative | Negative | Negative | Negative | Negative | Negative |
| Particle Size, nm. | 13–14 | 13–14 | 14–15 | 7–8 | 21–24 | 13–14 | 13–14 | 4 |
| Specific Surface Area SqM/g. | 210–230 | 210–230 | 195–215 | 375–420 | 125–140 | 210–230 | 210–230 | 750 |
| Silica (as $SiO_2$), wt. % | 40 | 30 | 30 | 30 | 49.5 | 30 | 30 | 15 |
| pH | 9.7[1] | 9.8[1] | 8.4[1] | 9.9[1] | 8.9[1] | 9.0[1] | 9.6[1] | 10.4–10.7 |
| Titratable alkali(as $Na_2O$), wt.% | 0.43 | 0.32 | 0.10 | 0.60 | 0.21 | 0.19 | 0.09[5] | 0.80 |
| $SiO_2/Na_2O$ (by wt.) | 90 | 90 | 300 | 50 | 230 | 160 | 120[6] | 19 |
| Viscosity (cps) | 17.5[2] | 4.5[2] | 14[2] | 5.5[2] | 50[2] | 17[2] | 20[2] | 18 |
| wt./gal (lbs.) | 10.8[1] | 10.1[1] | 10.1[1] | 10.1[1] | 11.6[1] | 10.1[1] | 10.1[1] | 9.2[1] |
| Sp. Gravity | 1.30[1] | 1.21[1] | 1.21[1] | 1.21[1] | 1.39[1] | 1.21[1] | 1.21[1] | 1.104[1] |
| Conductance (Micromhos) | 4730[3] | — | 1570[3] | 4730[3] | — | 2270[3] | 2630[3] | — |

| | 9 | 10 | 11 | 12 | 13 | 14 | 15 | 16 |
|---|---|---|---|---|---|---|---|---|
| Stabilizing Counter-Ion | Ammonium | Na | Na | Na | Na | Na | Ammonium | Na |
| Particle Charge | Negative | Negative | Negative | Negative | Negative | Negative | Negative | Negative |
| Particle Size, nm. | 5 | 8 | 15 | 13 | 20 | 60 | 20 | 8 |
| Specific Surface Area SqM/g. | 600 | 375 | 200 | 190–270 | 120–176 | 40–60 | 150 | — |
| Silica (as $SiO_2$), wt. % | 14.5 | 30 | 40 | 30 | 50 | 50 | 40 | 30 |
| pH | 9.0 | 10.0 | 9.7 | 10.2 | 9.0 | 8.5 | 9.3 | 10.7[1] |
| Titratable alkali(as $Na_2O$), wt. % | 0.01[7] | 0.65 | 0.40 | 0.40 | 0.35 | 0.25 | <0.1[9] | 0.45 |
| $SiO_2Na_2O$ (by wt.) | 48[6] | 46 | 100 | 75 | 143 | 200 | 200[6] | 67 |
| Viscosity (cps) | 5 | 6 | 12 | 5 | 40 | 10 | 20 | 6 |
| wt./gal (lbs.) | 9.1 | 10.1 | 10.8 10.1 | 11.6 | 11.6 | 10.8 | 10 | |
| Sp. Gravity | 1.092[8] | 1.214 | 1.296[8] | 1.208[8] | 1.390[8] | 1.390[8] | 1.292[8] | 1.22 |

| | 17 | 18 | 19 | 20 | 21 | 22 |
|---|---|---|---|---|---|---|
| Stabilizing Counter-Ion | Na | Na | Na | Na | Na | — |
| Particle Charge | Negative | Negative | Negative | Negative | Negative | — |
| Particle Size, nm. | 3–4 | 14 | 14 | 22 | 22 | 16–22 |
| Specific Surface Area SqM/g. | — | — | — | — | — | 135–190 |
| Silica (as $SiO_2$), wt. % | 15 | 30 | 40 | 50 | 40 | 34 |
| pH | 11 | 10.4 | 10.4 | 10 | 10 | 3.1 |
| Titratable alkali(as $Na_2O$), wt. % | 0.75 | 0.35 | 0.48 | 0.48 | — | <0.05 |
| $SiO_2/Na_2O$ (by wt.) | 20 | 86 | 83 | 104 | — | — |
| Viscosity (cps) | 5 | 6 | 16 | 50 | 10 | <20 |
| wt./gal (lbs.) | 9.2 | 10 | 10.9 | 11.5 | 10.8 | 10.2 |
| Sp. Gravity | 1.1 | 1.21 | 1.30 | 1.4 | 1.30 | 1.230[8] |

[1] @25° C., 77° F.
[2] @25° C., 77° F. by Ostawald-Fenske pipette No. 100 or 200, depending on Visc. Range
[3] @20° C., 69° F.
[4] Surface modified with aluminate ions
[5] Sol contains 0.25% $NH_3$ and 0.09% $Na_2O$
[6] $SiO_2/NH_3$ (by wt.)
[7] Sol contains 0.30% $NH_3$ and 0.01% $Na_2O$
[8] @20° C., 68° F.
[9] Sol contains 0.2% $NH_3$ and <0.1 $Na_2O$ An example of a cationic colloidal silica is one where some of the surface atoms are aluminum atoms. This allows for creation of a fixed positive charge. One such aqueous colloidal silica, stabilized by chloride ions, is most stable in the range of pH 3.5 to 5.5. This aqueous colloidal silica, comprises 26% silica and 4% alumina, and is characterized as:

| Stabilizing counter ion | Chloride |
|---|---|
| Particle Charge | Positive |
| Particle Size, nm | 13–15 |
| Specific surface area, sq. m/g | 200–220 |
| Silica (as $SiO_2$), wt. %/alumina wt. % | 26/4 |
| pH (25° C., 77° F.) | 4.4 |
| Chlorides (as NaCl), wt. % | 1.4 |
| Viscosity (25° C., 77° F.), cps | 5.15 | perses in water to yield sols of the ultimate fibrils. The surface of the fibrils is modified by absorbed acetate ions. The powder has the following typical composition:

| | Percent |
|---|---|
| AlOOH | 83.1 |
| $CH_3OOH$ | 9.8 |
| $SO_4$ | 1.7 |
| Water | 5.0 |
| $NH_4$ | 0.2 |
| Na | 0.07 |
| Fe | 0.02 |
| $SiO_2$ | 0.02 | and the following typical physical properties:

| | |
|---|---|
| Specific surface area | 274 sq. m/g |
| Pore volume | 0.53 c.c./g. |
| Pore diameter | 77 Angstroms |
| Bulk density | |
| - loose | 26 lbs/ft$^3$ |
| - packed | 31 lbs/ft$^3$ |
| Absolute density (fibril) | 2.28 g./c.c. |
| Refractive index (fibril) | 1.580 n$_{25}^D$ |
| Oil absorption | 147 (ASTM D-281-31) |
| Color | White |
| pH-4% sol | 3.8 (KCl bridge/calomel cell) |
| | 4.3 (no bridge) |
| Particle charge in sol | Positive |

Attention is drawn to "Colloid Chemistry", A. Sheludko, First English Edition, Elsevier Publishing Company, Amsterdam 1966, and particularly Chapter VII thereof, entitled "Stability of Lyophobic Sols", wherein there is discussed inter alia coagulation of colloids by electrolytes and the kinetics of fast coagulation, and wherein there are given numerous examples of colloidal sols and electrolytes which cause gelation.

Examples of electrolytes which can be employed in the gel forming system of the invention are electrolytes which are capable of causing "fast gelation" (see Sheludko, supra) of the particular colloid sol employed. The electrolyte is a salt, dissociable in water, which can be an inorganic, organic or mixed salt. The salt can be a monofunctional or polyfunctional salt, or even a polymeric salt. Typical functional electrolytes are salts such as, for example, alkali metal tripolyphosphoric acid salts and alkali metal salts of ethylenediamine tetraacetic acid. Polymeric salts such as sodium carboxymethyl hydroxyethyl cellulose and alkali metal salts of styrene-maleic anhydride copolymers are useful electrolytes. Numerous other electrolytes are exemplified by Sheludko, supra and are thereof not repeated here. Still other electrolytes which can be used to gel anionic colloidal silica sols include ethylenediamine tetraacetic acid, its mono, its di, tri, and tetra sodium salts, and its di(triethylamine) salt as well as potassium tripolyphosphate, disodium phosphate, polyphosphoric ester acid anhydride potassium salt, sodium polyacrylic acid, carboxyl ion exchange resins in their acid or neutral form, sulfonic acid ion exchange resins in their acid or neutral form, diethylene triamine, sodium chloride and hydrochloric acid.

Although we do not desire to be bound by any theory, it is believed that the gelation of the colloid by the electrolyte occurs as follows: In a sol free of other than stabilizing counter-ions, the counter-ions balancing the particle surface charge form a diffuse layer around each particle. The effective surface charge or potential extends out from the particle surface a considerable distance, resulting in strong repelling forces between particles. When electrolyte is added to the sol, the ionic strength within the diffuse layer increases and the increased conductivity causes the diffuse layer to shrink. The counter ions are pulled in closer to the particle surface. This reduces the effective repulsive forces between particles, allows closer contact, more frequent collisions between particles, and more rapid gelation. Since polyvalent salts are more effective in shrinking the diffuse layer, they are more effective as gelling agents.

When acidic electrolytes are used to gel anionic colloidal sols, or when basic electrolytes are used to gel cationic sols a somewhat different mechanism is theorized to exist.

The colloid and electrolyte are employed in an amount sufficient with respect to each other and to the total system so that upon substantially complete interaction between the colloid and electrolyte there is formed a substantially stable gelled system which is solidified to a solid or semisolid state yet which can be reduced by the application of a relatively small shearing force at a relatively small shearing rate, for example, as provided by a person using a painting implement, for example, a pad applicator, to an acceptable ordinary painting viscosity.

Since pigment particles, as well as polymeric particles (e.g. latex particles) are commonly dispersed particles carrying a charge, they are capable of interaction with electrolyte and colloidal gelling species. These interactions may influence the gelling mechanism. The amount of gelling agent and/or electrolyte may require adjustment to compensate for the presence of such an interacting material.

The solid coating compositions of the invention can be formulated in a number of ways. If desired, a conventional coating composition can be prepared and the gel forming system then added thereto. Alternatively one or both of the colloid and the electrolyte may be added during the coating composition formation process. In any event, the final coating composition, containing the gel forming system, may be introduced into a container, adapted to provide a surface area compatible with the applicator to be used to transfer the coating composition from the container to the surface to be coated, prior to significant gel formation. Alternatively, the composition may be processed to its gel form as a slab, which is subsequently cut to shape conforming to that of its final container. As it is frequently desirable to use a pad applicator, the container is typically a relatively shallow pan, although other types of containers can be employed. In one preferred form the surface of the container is sealed with a plastic film in contact with the paint surface.

Since the interaction of the colloid and electrolyte frequently requires a substantial period of time at room temperature, in order to obtain a gel structure which is stable within convenient commercial plant production parameters, it is frequently desirable to accelerate the substantially complete interaction between the electrolyte and colloid by the application of heat. It is therefore preferred to heat the compositions of the invention at an elevated temperature, below the temperature which has a deleterious effect on the coating composition components, for a time sufficient to substantially complete the colloid-electrolyte interaction. Usually holding the final coating composition at about 48° to about 82° C. for about 1 to 40 hours is sufficient to accomplish this result.

While, as previously stated, the coating composition components, other than the gel forming system, are present to perform a conventional coating composition formulation function; in one preferred form, the compositions of the invention can contain minor amounts of a high boiling organic solvent to aid in the prevention or retardation of crack formation in the applied film. Where the solvent selected is water insoluble, and not a true solvent for the binders which are present, the presence of the solvent in the system also serves to increase hiding by the creation of microvoids as taught by Seiner, U.S. Pat. Nos. 3,669,728 and 3,669,729. Since these unique gel forming systems act as an ideal matrix for finely dispersed droplets of solvent, stability of these droplets is enhanced. Over extensive periods of storgage, coalescence of solvent droplets can occur in conventional liquid paints. This is precluded where gel entrapment is present. When subjected to a relatively small shearing force at a relatively small shearing rate the coating compositions viscosity reduces to that of a liquid plant. At this point droplet stability would be reduced to that of a liquid paint. Since, however, the duration of this liquified period is short, an appreciable hiding improvement over that taught by Seiner is observed.

Where the use of a pad applicator is contemplated, the coating composition, absent the gel forming system, is designed to have a low value of its high shear viscosity to reduce applicator drag.

The stable "solid" coating compositions formed vary from semi-solids to firm solids all of which are characterized by being self-supporting and resistant to flow in the absence of an applied shearing force. The preferred solid coating compositions are sufficiently solid to display a spike value, as defined hereinafter, of at least about 8. (Typically, the coating compositions display a penetrometer value, as defined hereinafter, of less than about 35 mm).

The coating compositions of the invention are further characterized in that the viscosity contributed by the gel forming system is diminished upon the application of reasonable shear forces, such as those applied by a human with a conventional coating applicator, to the extent that the coating compositions have transfer properties suited to the use of a coating applicator, such as a pad applicator; and then as further shearing forces are applied, during the application of the coating composition, the coating compositions have application properties suited to the use of the applicator. Generally, the coating composition after substantially complete destruction of the colloidal gelling agent—electrolyte contributed gel structure by reasonable shearing forces, such as those applied by a human during transfer and application, has a viscosity at 780 sec$^{-1}$ of between about 2.5 poise and about 10 poise and preferably between about 3 poise and about 7 poise.

While the useful and optimum proportions of the various materials in the compositions of the invention may vary widely, dependent in part on the nature of the specific materials and their interaction with each other, and while to a significant extent the particular proportions of a substantial part of the composition are governed by selection within standard coating composition formulation technology, generally taking the essentially water reducible polymer, the colloid, and the electrolyte as 100 parts by weight, the composition usually comprises between about 25 to about 99 parts, and preferably about 60 to about 95 parts by weight of the water reducible polymer; and about 0.7 to about 60.0, and preferably about 1 to about 20 parts by weight of the colloid; and about 0.1 to about 50 parts and preferably between about 2 to about 20 parts by weight of the electrolyte; with the weight ratio of water to this system generally being at 9:1 to about 1:2.

While the disclosure addresses the use of a single material to perform a function, in all cases, if desired, that function can be provided by a combination of two or more materials having the same function.

There follow a number of examples which describe the invention. These examples should be considered illustrative rather than limiting. All parts and percentages in the examples, as well as the entire disclosure are by weight unless otherwise specified. All temperatures are degrees Centigrade unless otherwise specified.

In the following examples preliminary evaluations were made using a generally flat pad type applicator with rounded edges to prevent the applicator from digging in and collecting coating composition on and over the applicator edges as it is drawn back and forth across the surface of the semi-solid coating composition, with sufficient pressure to cause the surface of the gel to break down and form a coating composition of appropriate transfer viscosity, and subsequent coating viscosity upon application to a substrate.

Also, in many of the examples, the gel strength and coating composition application viscosity were characterized by the use of a rheometer i.e. a Rotovisco RV3 Viscometer from Haake, Inc. using a SVIIP sensing system measured from 0–1000 rpm, using a 50/500 dual measuring head with the Spike being the scale reading at about 15 sec$^{-1}$ shear rate (for about 20 rpm) and the End Point at about 779 sec$^{-1}$ (or about 1000 rpm). (All Rotovisco viscometer values reported are measurements made using the 500 measuring head).

Another method sometimes used to characterized gel strength is the measurement of penetration, in millimeters, with a Lab Line Universal Penetrometer, using the stainless steel cone and the automatic five second timer to halt plunger fall. The lower the penetrometer reading, the higher the gel strength.

EXAMPLE 1

Solid coating compositions were prepared using conventional formulation and grinding techniques:

| Ingredients | Amounts (Parts by Weight) | |
| --- | --- | --- |
| | Ex. 1A | 1B |
| carboxylmethyl hydroxyethyl cellulose. 0.4 carboxymethyl and 2 hydroxyethyl substitutions per anhydroglucose unit (Hercules 420H) as sodium salt 2% solids in water. (Also present are 0.01% phenyl mercuric acetate and 0.02% Defoamer L475) | 500.0 | 459.0 |
| polyphosphoric ester acid anhydride potassium salt (Strodex SEK-50-Dexter Chemical) (50% solids) | 28.0 | 28.0 |
| sodium salt of a polymeric carboxylic acid (Tamol 731 - Rohm & Haas) (25% solids) | 48.0 | 48.0 |
| nonylphenoxypolyethoxy ethanol (Triton N-57 Rohm & Haas) | 8.0 | 8.0 |
| sodium alkyl aryl polyether sulfonate | | |

-continued

| Ingredients | Amounts (Parts by Weight) Ex. 1A | 1B |
|---|---|---|
| (Triton X-200) | 4.0 | 4.0 |
| silica and mineral oil defoamer | | |
| (Defoamer L475 - Drew Chemical) | 28.0 | 28.0 |
| phenylmercuric acetate (30% solution) | 2.0 | 2.0 |
| ethylene glycol | 160.0 | 160.0 |
| phenyl ether of ethylene glycol | 32.0 | 32.0 |

There was then added to the mixture:

| Ingredients | Ex. 1A | 1B |
|---|---|---|
| diatomaceous earth (Celite 499 Johns-Manville) | 42.4 | 42.4 |
| calcium modified $SiO_2$ (Hi-Sil 422 PPG Industries) | 80.0 | 80.0 |
| $TiO_2$ (R-900 DuPont) | 938.0 | 938.0 |
| $TiO_2$ (R-902 DuPont) | 402.0 | 402.0 |
| Barium sulfate | 200.0 | 200.0 |

The mixture was then dispersed for ten minutes with a Cowles dissolver. There was then added:

| Ingredients | Ex. 1A | 1B |
|---|---|---|
| high boiling hydrocarbon solvent (Soltrol 200 Phillips Petroleum) | 106.0 | 106.0 |
| non-ionic surfactant (Triton X-45 Rohm & Haas) | 3.0 | 3.0 |

The mixture was dispersed for five minutes on a Cowles dissolver and let down into a mixture of:

| Ingredients | Ex. 1A | 1B |
|---|---|---|
| sodium salt of styrene-maleic anhydride copolymer (Arco Chemical SMA-1000A, 100% theoretical neutralization) as 40% solids | 56.0 | 56.0 |
| clay slurry (Al-Sil-Ate NC slurry-Freeport Kaolin) (68% solids) | 530.0 | 530.0 |
| vinyl chloride, vinyl acetate, ethylene terpolymer (Airflex A-728-Airco Chemical Co.) (52% solids) | 1123.2 | 0 |
| styrene-butadiene latex; 49% solids (Uniroyal Latex 2752) | 0 | 1123.2 |

The equipment was washed out with the indicated amount of water which was then added to the composition:

| Ingredients | Ex. 1A | 1B |
|---|---|---|
| Water | 615.7 | 602.4 |

To the above mixture was then added and admixed:

| Ingredients | Ex. 1A | 1B |
|---|---|---|
| 50% potassium tripolyphosphate | 24.0 | 48.0 |
| colloidal silica (Table 1 #4) | 250.0 | 232.0 |

The mixture was blended for two minutes and then filled into shallow metal pans. The filled pans were covered with a Mylar film in contact with the surface of the paint. The metal pans were closed with a metal lid, then heated in an enclosure at 71° C. for sixteen hours to provide a semi-solid stable paint, which can be applied to a substrate by, for example, the use of a pad applicator rubbed across the solid paint and then applied to the substrate. The applied properties on a plaster board wall were similar to those of a conventional interior latex paint.

The resultant gels had the following properties:

| Rotovisco data | No. 1A | 1B |
|---|---|---|
| Spike | 9.0 | 40.0 |
| End | 6.8 | 15.2 |

EXAMPLE 2

Solid coating compositions were prepared using the procedure of Example 1:

| Ingredients | Amounts (Parts by Weight) Ex. No. 2A | 2B |
|---|---|---|
| water | 98.1 | 98.1 |
| polyphosphoric ester acid anhydride potassium salt (Strodex SEK-50) (50% solids) | 7.0 | 7.0 |
| sodium salt of a polymeric carboxylic acid (Tamol 731) (25% solids) | 12.0 | 12.0 |
| nonylphenoxypolyethoxyethanol (Triton N-57) | 2.0 | 2.0 |
| Sodium alkyl aryl polyether sulfonate (Triton X-200) | 1.0 | 1.0 |
| silica and mineral oil defoamer (Defoamer L-475) | 7.0 | 7.0 |
| phenyl ether of ethylene glycol | 8.0 | 8.0 |
| ethylene glycol | 40.0 | 40.0 |
| phenylmercuric acetate (30% solution) | 0.5 | 0.5 |
| colloidal magnesium aluminum silicate (Veegum T - RT Vanderbuilt) | 20.0 | 20.0 |
| diatomaceous earth (Celite 499) | 10.6 | 10.6 |
| calcium modified $SiO_2$ (Hi-Sil 422) | 20.0 | 20.0 |
| $TiO_2$ (DuPont R-900) | 335.0 | 335.0 |
| Barium sulfate | 50.0 | 50.0 |
| Clay slurry (Al-Sil-Ate NC Slurry | | |

-continued

| Ingredients | Amounts (Parts by Weight) | |
|---|---|---|
| | Ex. No. 2A | 2B |
| Freeport Kaolin) (68% solids) | 132.4 | 132.4 |
| water | 200 | 200 |
| Latex Vehicle (Rohm and Haas AC64) (60.5% solids - solids believed to comprise 43% methyl methacrylate, 55% butyl acrylate, 2% methacrylic acid) | 0 | 375.0 |
| Latex Vehicle (Rohm and Haas AC-490) (46.5% solids - solids believed to comprise 66% ethyl acrylate, 33% methyl methacrylate, 1% methacrylic acid) | 375.0 | 0 |
| tetrasodium ethylenediamine tetraacetate | 7.64 | 7.64 |
| colloidal silica (Table 1 #4) | 50.0 | 50.0 |

Both the above formulations were filled into metal pans immediately after preparation and then surfaced over with a Mylar film, and then lidded. The sealed pans were placed in a room at 71° C. for 16 hours. Upon application to a surface by rubbing a flat applicator across the gelled composition surface, and then applying the applicator to a surface in a conventional painting mode, both compositions showed good breakdown.

EXAMPLE 3

A solid coating composition was prepared using the procedure of Example 1.

| Ingredient | Parts by Weight |
|---|---|
| carboxymethyl hydroxyethyl cellulose (2% Hercules 420H) | 108 |
| polyphosphoric ester acid anhydride potassium salt (Strodex SEK-50) (50% solids) | 6.59 |
| sodium salt of a polymeric carboxylic acid (Tamol 731) (25% solids) | 11.3 |
| nonyl phenoxypolyethoxyethanol (Triton N-57) | 1.88 |
| sodium alkyl aryl polyether sulfonate (Triton X-200) | 0.94 |
| silica and mineral oil defoamer (Defoamer L-475) | 1.88 |
| phenylmercuric acetate (30% sol) | 0.47 |
| ethylene glycol | 37.67 |
| phenyl ether of ethylene glycol | 7.53 |
| diatomaceous earth (Celite 499) | 9.98 |
| calcium modified $SiO_2$ (Hi-Sil 422) | 18.84 |
| $TiO_2$ (R-900) | 220.86 |
| $TiO_2$ (R-902) | 94.65 |
| barium sulfate | 47.09 |
| high boiling hydrocarbon solvent (Soltrol 200) | 24.96 |
| non-ionic surfactant (Triton X-45) | 0.71 |
| water | 132.98 |
| silica and mineral oil defoamer (Defoamer L475) | 4.71 |
| clay slurry (Al-Sil-Ate NC Slurry) Freeport Kaolin (68% solids) | 124.79 |
| sodium salt of styrene-maleic anhydride copolymer (Arco Chemical) 40% solids | 13.19 |
| Acylic latex (Rohm and Haas AC-64) (60.5% solids) (solids believed to comprise 43% methyl methacrylate, 55% butyl acrylate, 2% methacrylic acid) | 264.46 |
| colloidal silica (Table 1 #4) | 73.46 |

The mixture was packaged and heat treated as in Example 1. A semi-solid stable coating composition was obtained which could be applied to a substrate by the use of a pad applicator rubbed across the surface of the solid coating composition and then applied to the substrate. The applied properties on a plaster board wall were similar to those of a conventional latex paint.

EXAMPLE 4

Conventional white interior water based paints, PPG Industries Wallhide white and pastel tinting base 80-6, containing a vinyl acetate acrylic copolymer (Paint 1) and PPG Industries Satinhide Latex Enamel white and pastel tinting base 88-6 containing an acrylic polymer (Paint 2) were additionally formulated as follows:

| Composition | Parts by Weight | |
|---|---|---|
| | 4A | 4B |
| Paint 1 | 400 | 0 |
| Paint 2 | 0 | 400 |
| 30% colloidal silica (Table 1 #4) | 8.0 | 8.0 |
| tetrasodium ethylene diamine tetraacetate | 2.5 | 2.5 |

After heat processing as in Example 1, the solid coating compositions had the following viscosity properties:

| | | |
|---|---|---|
| spike | 16.5 | 12.5 |
| end point | 7.5 | 7.5 |

EXAMPLE 5

A commercial water-based paint, PPG Industries, water-based Enamel Undercoater 6-755, containing a mixture of a water dispersable alkyd and a urethane modified alkyd, (Paint 3) was additionally formulated as follows:

| composition | (Parts by Weight) | |
|---|---|---|
| | 5A | 5B |
| Paint 3 | 80 | 80 |
| 30% Colloidal Silica dispersion (Table 1 #4) | 25 | 25 |
| tetrasodium ethylenediamine tetraacetate | 3.0 | 3.5 |

After heat processing as in Example 1, the solid coating composition had the following viscosity properties:

| | | |
|---|---|---|
| spike | 28.5 | 33.0 |
| end | 12.5 | 15.0 |

EXAMPLE 6

A solid coating composition was prepared following the procedure of Example 1:

| Ingredients | Amounts (Parts by Weight) |
|---|---|
| carboxylmethyl hydroxyethyl cellulose, (Hercules 420H) (2% solids) | 459 |
| polyphosphoric ester acid anhydride potassium salt (Strodex SEK-50) (50% solids) | 28.0 |
| sodium salt of a polymeric | |

-continued

| Ingredients | Amounts (Parts by Weight) |
|---|---|
| carboxylic acid (Tamol 731) (25% solids) | 48.0 |
| nonylphenoxypolyethoxyethanol (Triton N-57) | 8.0 |
| sodium alkyl aryl polyether sulfonate (Triton X-200) | 4.0 |
| silica and mineral oil defoamer (Defoamer L-475) | 8.0 |
| phenyl mercuric acetate (30% solution) | 2.0 |
| ethylene glycol | 160.0 |
| phenyl ether of ethylene glycol | 32.0 |
| diatomaceous earth (Celite 499) | 42.4 |
| calcium modified SiO$_2$ (Hi-Sil 422) | 80.0 |
| TiO$_2$ (DuPont R-900) | 938 |
| TiO$_2$ (DuPont R-902) | 402 |
| Barium sulfate | 200 |
| high boiling hydrocarbon solvent (Soltrol 200) | 106 |
| non-ionic surfactant (Triton X-45) | 3.0 |
| silica and mineral oil defoamer (Defoamer L-475) | 20.0 |
| clay slurry (Al-Sil-Ate NC Slurry Freeport Kaolin) (68% solids) | 530 |
| water | 196.7 |
| sodium salt of styrene-maleic anhydride copolymer (Arco Chemical) (5.4% solids) | 420 |
| Latex Vehicle (Rohm and Haas AC-64) | 1123.2 |
| Colloidal silica (Table 1 #4) | 312 |

After heat processing, as in Example 1, the semi-solid coating composition had the following viscosity properties: Spike 24.5; end 9.5.

Several weeks later, the above solid coating composition was studied to demonstrate the lack of viscosity recovery with time. Using the Rotovisco RV3 Viscometer, as described above, a first curve (FIG. 1-initial) was obtained on the solid coating composition. The resultant reduced viscosity coating composition sample was then sealed, and after 24 hours, a second curve (FIG. 1-sheared and 24 hour recovery) was obtained. The low shear rate (16 sec$^{-1}$) Spike readings show a lack of substantial viscosity recovery based on gel structure: initial spike 30.5, end 9.5; 24 hour recovery re-run spike 6.0, end 9.0 (The curves in FIG. 1 are presented on a logarithmic scale).

Figure 1:
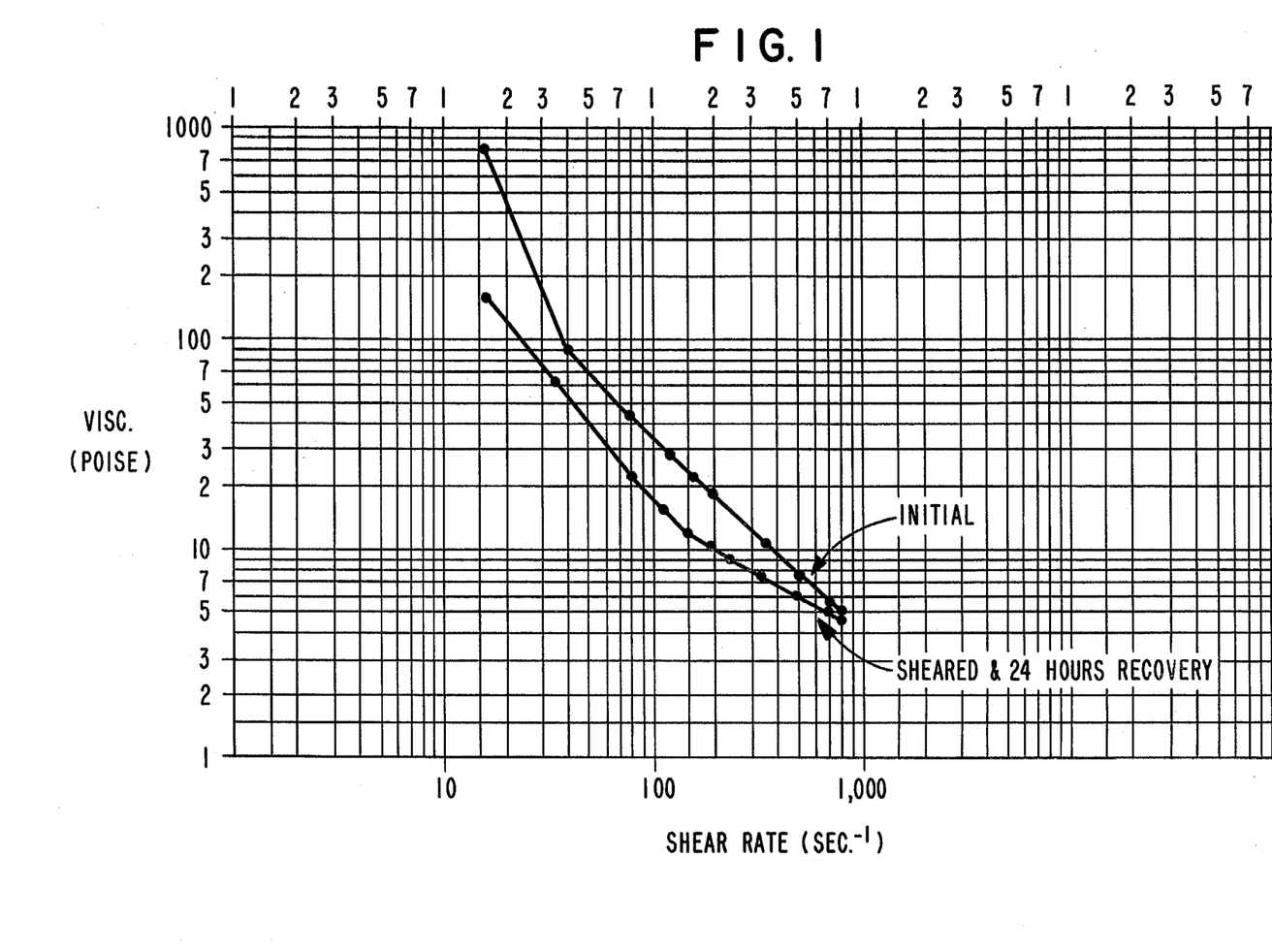

As the curves in FIG. 1 indicated, some viscosity recovery occurred. A significant portion of which is contributed by the conventional coating formulation. As with most conventional coating compositions intended for use with brush, roller or pad applicators, a degree of thixotropy is built into the composition to aid conventional application properties.

EXAMPLE 7

Using the procedure of Example 1, a number of solid coating compositions were prepared. As can be seen lower levels of colloid or higher relative levels of electrolyte provide more stable compositions.

| Ingredient | Parts by Weight | | |
|---|---|---|---|
| Ex. No. | 7A | 7B | 7C |
| carboxymethyl hydroxyethyl cellulose (Hercules 37L) (5.3% solids) | 377.4 | 377.4 | 377.4 |
| polyphosphoric ester acid anhydride potassium salt (Strodex SEK-50) (50% solids) | 28.0 | 28.0 | 28.0 |
| sodium salt of a polymeric carboxylic acid (Tamol 731) (25% solids) | 48.0 | 48.0 | 48.0 |
| nonyl phenoxypolyethanol (Triton N-5o7) | 5.0 | 8.0 | 8.0 |
| sodium alkyl aryl polyether sulfonate (Triton X-200) | 4.0 | 4.0 | 4.0 |
| silica and mineral oil defoamer (Defoamer L-475) | 8.0 | 8.0 | 8.0 |
| phenylmercuric acetate (30% solution) | 2.0 | 2.0 | 2.0 |
| ethylene glycol | 160.0 | 160.0 | 160.0 |
| phenyl ether of ethylene glycol | 32.0 | 32.0 | 32.0 |
| diatomaceous earth (Celite 499) | 42.4 | 42.4 | 42.4 |
| calcium modified SiO$_2$ (Hi-Sil 422) | 80.0 | (0.0 | 80.0 |
| TiO$_2$ (R-900) | 1340 | 1340 | 1340 |
| barium sulfate | 200.0 | 200.0 | 200.0 |
| water | 203.4 | 276.3 | 349.0 |
| silica and mineral oil defoamer (Defoamer L 475) | 20.0 | 20.0 | 20.0 |
| clay slurry (Al-Sil-Ate NC slurry-Freeport Kaolin) (68% solids) | 530 | 530 | 530 |
| sodium salt of styrene-maleic anhydride copolymer (Arco Chemical) (5.4% solids) | 500 | 500 | 500 |
| Acrylic latex (Rohm and Haas AC-64) | 1123 | 1123 | 1123 |
| colloidal silica (Table 1 #4) | 488.0 | 400.0 | 312.0 |
| tributylphosphate | 20.0 | 20.0 | 20.0 |
| All treated at 71° C. for 16 hours Rotovico data: Spike | 77.0 | 50.5 | 29.0 |

-continued

| Ingredient | Ex. No. | 7A | 7B | 7C |
|---|---|---|---|---|
| End Point | | 11.0 | 9.0 | 7.5 |

After heat treating sealed containers at 71° C.
for 32 additional hours
Rotovico data:

| | | | | |
|---|---|---|---|---|
| Spike | | 100+ | 89.0 | 29.5 |
| End Point | | 14.0 | 15.0 | 8.0 |

EXAMPLE 8

Using the procedure of Example 1, a number of solid coating compositions were prepared.

| | Ex. No. | | | | | | |
|---|---|---|---|---|---|---|---|
| Ingredient | 8A | 8B | 8C | 8D | 8E | 8F | 8G |
| water | 71.4 | 71.4 | 71.4 | 71.4 | 71.4 | 71.4 | 251 |
| polyphosphoric ester acid anhydride potassium salt (Strodex SEK-50) (50% solids) | 7.0 | 7.0 | 7.0 | 7.0 | 7.0 | 7.0 | 28.0 |
| sodium salt of a polymeric carboxylic acid (Tamol 731) (25% solids) | 12.0 | 12.0 | 12.0 | 12.0 | 12.0 | 12.0 | 48.0 |
| nonyl phenoxypolyethoxyethanol (Triton N-57) | 2.0 | 2.0 | 2.0 | 2.0 | 2.0 | 2.0 | 8.0 |
| sodium alkyl aryl polyether sulfonate (Triton X-200) | 1.0 | 1.0 | 1.0 | 1.0 | 1.0 | 1.0 | 4.0 |
| silica and mineral oil defoamer (Defoamer L-475) | 2.0 | 2.0 | 2.0 | 2.0 | 2.0 | 2.0 | 8.0 |
| phenylmercuric acetate (30% solution) | 0.5 | 0.5 | 0.5 | 0.5 | 0.5 | 0.5 | 2.0 |
| ethylene glycol | 40.0 | 40.0 | 40.0 | 40.0 | 40.0 | 40.0 | 160 |
| phenyl ether of ethylene glycol | 8.0 | 8.0 | 8.0 | 8.0 | 8.0 | 8.0 | 32.0 |
| polyvinyl alcohol (Elvanol 52-22 DuPont) | 5.0 | 10.0 | 0 | 0 | 0 | 0 | 0 |
| hydroxyethyl cellulose (QP-300-Union Carbide) | 0 | 0 | 5.0 | 0 | 0 | 0 | 0 |
| carboxymethyl cellulose (Hercules 7L) | 0 | 0 | 0 | 1.0 | 2.0 | 3.0 | 0 |
| hydroxyethyl cellulose (Hercules 250 MR) | 0 | 0 | 0 | 0 | 0 | 0 | 9 |
| diatomaceous earth (Celite 499) | 10.6 | 10.6 | 10.6 | 10.6 | 10.6 | 10.6 | 42.4 |
| calcium modified SiO$_2$ (Hi-Sil 422) | 20.0 | 20.0 | 20.0 | 20.0 | 20.0 | 20.0 | 80.0 |
| TiO$_2$ (R-900) | 335 | 335 | 335 | 335 | 335 | 335 | 938 |
| TiO$_2$ (R-902) | 0 | 0 | 0 | 0 | 0 | 0 | 402 |
| barium sulfate | 50.0 | 50.0 | 50.0 | 50.0 | 50.0 | 50.0 | 200 |
| high boiling hydrocarbon solvent (Soltrol 200) | 0 | 0 | 0 | 0 | 0 | 0 | 106.0 |
| non-ionic surfactant (Triton X-45) | 0 | 0 | 0 | 0 | 0 | 0 | 3.0 |
| water | 28.0 | 28.0 | 28.0 | 28.0 | 28.0 | 28.0 | 397 |
| silica and mineral oil defoamer (Defoamer L 475) | 5.0 | 5.0 | 5.0 | 5.0 | 5.0 | 5.0 | 20.0 |
| clay slurry Al-Sil-Ate NC (68% solids) | 132.4 | 132.4 | 132.4 | 132.4 | 132.4 | 132.4 | 530 |
| sodium salt of styrene-maleic anhydride copolymer (Arco Chemical) 3.5% solids | 125 | 125 | 125 | 125 | 125 | 125 | 420 (5.4% solids) |
| Acrylic latex (Rohm and Haas AC-64) | 375 | 375 | 375 | 375 | 375 | 375 | 1123 |
| colloidal silica (Table 1 #4) | 122.2 | 122.2 | 122.2 | 122.2 | 122.2 | 122.2 | 312 |
| Aminomethylpropanol | 0 | 0 | 2.0 | 0 | 0 | 0 | 2.0 |

The mixture was packaged and heat treated as in Example 1. A semi-solid stable coating composition was obtained which could be applied to a substrate by the use of a pad applicator rubbed across the surface of the solid coating composition and then applied to the substrate. The applied properties on a plaster board wall were similar to those of a conventional latex paint.

EXAMPLE 9

Following the procedures of Example 1, a solid coating composition was prepared with the following ingredients:

| Ingredient | Parts by Weight |
|---|---|
| Carboxymethylhydroxyethyl cellulose (Hercules-420H) 2% solids | 459.0 |
| polyphosphoric ester acid anhydride potassium salt (Strodex SEK-50) (50% solids) | 28.0 |
| sodium salt of a polymeric carboxylic acid (Tamol 731) (25% solids) | 48.0 |
| nonylphenoxypolyethoxyethanol (Triton N-57) | 8.0 |
| sodium alkyl aryl polyether sulfonate (Triton X-200) | 4.0 |
| silica and mineral oil defoamer (Defoamer-L-475) | 28.0 |
| phenylmercuric acetate (30% solution) | 2.0 |
| ethylene glycol | 160.0 |
| phenyl ether of ethylene glycol | 32.0 |
| diatomaceous earth (Celite 499) | 42.4 |
| calcium modified SiO$_2$ (Hi-Sil 422) | 80.0 |
| TiO$_2$ (DuPont R-900) | 938.0 |
| TiO$_2$ (DuPont R-902) | 402.0 |
| barium sulfate | 200.0 |
| high boiling hydrocarbon solvent (Soltrol 200) | 106.0 |
| non-ionic surfactant (Triton X-45) | 3.0 |
| clay slurry (Al-Sil-Ate NC) (68% solids) | 530.0 |
| water | 196.7 |
| sodium salt of styrene-maleic anhydride copolymer (5.4% solids) | 420.0 |
| Latex vehicle (Rohm & Haas AC-64) | 1123.0 |

To 1000 parts of the above prepared coating composition there was then added and admixed 97 parts of the cationic colloidal silica, exemplified and characterized hereinabove. The resultant composition was heat treated as in Example 1. The resultant solid composition was shear reversible and, upon application of shear, liquified sufficiently to form a coatable composition.

EXAMPLE 10

To 1000 parts of the composition prepared in Example 9 (prior to the colloidal silica addition) there was added 97.3 parts of a 20% solids paste of Baymal colloidal alumina in water. After heat processing as in Example 1, the resultant solid coating composition was shown to be shear reversible to a coatable composition.

EXAMPLE 11

The neutralized Baymal colloidal alumina solution used in this example was prepared by adding 750 parts of Baymal (DuPont) to 3000 parts of water, to yield a suspension having a pH of about 4.4. Dilute sodium hydroxide was then added to a pH of 8.18.

Following the procedures of Example 1, a solid coating composition was prepared with the following ingredients:

| Ingredient | Parts by Weight |
|---|---|
| Carboxymethylhydroxyethyl cellulose (Hercules 420H) 2% solids | 459.0 |
| polyphosphoric ester acid anhydride potassium salt (Strodex SEK-50) (50% solids) | 28.0 |
| sodium salt of a polymeric carboxylic acid (Tamol 731) (25% solids) | 48.0 |
| nonylphenoxypolyethoxyethanol (Triton N-57) | 8.0 |
| sodium alkyl aryl polyether sulfonate (Triton X-200) | 4.0 |
| silica and mineral oil defoamer (Defoamer-L-475) | 28.0 |
| phenylmercuric acetate (30% solution) | 2.0 |
| ethylene glycol | 160.0 |
| phenyl ether of ethylene glycol | 32.0 |
| diatomaceous earth (Celite 499) | 42.4 |
| calcium modified SiO$_2$ (Hi-Sil 422) | 80.0 |
| TiO$_2$ (DuPont R-900) | 938.0 |
| TiO$_2$ (DuPont R-902) | 402.0 |
| barium sulfate | 200.0 |
| high boiling hydrocarbon solvent (Soltrol 200) | 106.0 |
| non-ionic surfactant (Triton X-45) | 3.0 |
| clay slurry (Al-Sil-Ate NC) (68% solids) | 530.0 |
| water | 196.7 |
| sodium salt of styrene-maleic anhydride copolymer (5.4% solids) | 420.0 |
| Latex vehicle (Rohm & Haas AC-64) | 1123.0 |
| neutralized Baymal solution (above) | 600.0 |

After heat treatment as in Example 1 the solid coating composition has the following properties: Spike 54.5, End 14.0.

EXAMPLE 12

The major film forming resin in this Example is a water soluble acrylic interpolymer of 63.75% isobutylmethacrylate, 21.25% 2-ethylhexyl acrylate and 15.00% methacrylic acid, fully neutralized (100% theoretical neutralization) with triethyl amine at 54.5% solids in the monomethylether of propylene glycol (Gardner-Holdt viscosity Z-2 to Z-3).

Coating compositions were prepared as follows:

| | Parts by Weight | |
|---|---|---|
| Ingredient | 12A | 12B |
| water | 160.0 | 200.0 |
| non-ionic surfactant octyl phenoxy polyethylene oxyethanol (Makon 10-Makon Chemical) | 1.5 | 1.5 |
| surfactant (Witco-912) | 5.0 | 5.0 |
| Defoamer NDW-M (Nopco Div. Diamond Shamrock) | 2.0 | 2.0 |
| surfactant (Triton X-45) | 5.0 | 5.0 |

The above were mixed and then there was slowly added:

| | | |
|---|---|---|
| Clay (Al-Sil-Ate) (Freeport Kaolin) (dry) | 262.0 | 327.0 |
| Calcium modified SiO$_2$ (Hi-Sil 422) | 32.0 | 40.0 |
| TiO$_2$ (DuPont R-931) | 60.0 | 75.0 |

The composition is then processed on a Cowles dissolver to disperse the pigments. There is then added:

| | Parts by Weight | |
|---|---|---|
| Ingredient | 12A | 12B |
| Soltrol 200 | 100 | 0 |

The composition is then dispersed on a Cowles dissolver and let down into a mixture of

| | Parts by Weight | |
|---|---|---|
| neutralized acrylic resin (above) | 219.0 | 274.0 |
| water | 206.0 | 187.0 |

A series of solid coating compositions were prepared by adding varying amounts of colloidal silica (Table 1 #4) and tetrasodium ethylenediamine tetraacetate (Na₄EDTA) to composition 12A.

| | Parts by Weight | | |
|---|---|---|---|
| Composition No. | 12A | Colloidal Silica | Na₄EDTA |
| 1 | 40 | 24 | 0.2 |
| 2 | 40 | 24 | 1.0 |
| 3 | 40 | 16 | 0 |
| 4 | 40 | 16 | 0.6 |
| 5 | 40 | 8 | 0.2 |
| 6 | 40 | 8 | 1.0 |

Another series of solid coating compositions were prepared by adding varying amounts of colloidal silica (Table 1 #4) and tetrasodium ethylenediamine tetracetate to composition 12B.

| | Parts by Weight | | |
|---|---|---|---|
| Composition No. | 12B | Colloidal Silica | Na₄EDTA |
| 7 | 40 | 24 | 0.2 |
| 8 | 40 | 24 | 1.0 |
| 9 | 40 | 16 | 0 |

EXAMPLE 13

Following the procedures of Example 1 a solid coating composition was prepared with the following ingredients:

| Ingredient | Parts by Weight |
|---|---|
| Carboxymethylhydroxyethyl cellulose (Hercules-42OH) 2% solids | 510.0 |
| polyphosphoric ester acid anhydride potassium salt (Strodex SEK-50) (50% solids) | 28.0 |
| sodium salt of a polymeric carboxylic acid (Tamol 731) (25% solids) | 48.0 |
| nonylphenoxypolyethoxyethanol (Triton N-57) | 8.0 |
| sodium alkyl aryl polyether sulfonate (Triton X-200) | 4.0 |
| silica and mineral oil defoamer (Defoamer-L-475) | 28.0 |
| phenylmercuric acetate (30% solution) | 2.0 |
| ethylene glycol | 160.0 |
| phenyl ether of ethylene glycol | 32.0 |
| diatomaceous earth (Celite 499) | 42.4 |
| calcium modified SiO₂ (Hi-Sil 422) | 80.0 |
| TiO₂ (Titanox 4101 Slurry, NL Industries) (76% solids) | 1751.6 |
| barium sulfate | 200.0 |
| high boiling hydrocarbon solvent (Soltrol 200) | 106.0 |
| non-ionic surfactant (Triton X-45) | 3.0 |
| clay slurry (Al-Sil-Ate NC) (68% solids) | 530.0 |
| water | 236.8 |
| sodium salt of styrene-maleic anhydride copolymer (40% solids) | 64.0 |
| Latex vehicle (Rohm & Haas AC-64) | 1123.0 |

| Ingredient | Parts by Weight |
|---|---|
| colloidal silica (Table 1 #8) | 300.0 |

After heat treatment as in Example 1 the solid coating composition has the following properties: Spike 23.8, End 7.3.

EXAMPLE 14

Various colloidal silicas, together with tetrasodium ethylenediaminetetraacetate, were added to a commercial water based system: PPG Industries, Manor Hall White & Pastel Tint Base 89-6.

| | Parts by Weight | | | |
|---|---|---|---|---|
| Ingredients | 14A | 14B | 14C | 14D |
| Tint Base | 400 | 400 | 400 | 400 |
| Na₄EDTA | 3.1 | 4.0 | 4.0 | 4.0 |
| water | 26 | 0 | 0 | 0 |
| colloidal silica (Table 1 #4) | 47 | 0 | 0 | 0 |
| colloidal silica (Table 1 #2) | 0 | 60 | 0 | 0 |
| colloidal silica (Table 1 #6) | 0 | 0 | 60 | 0 |
| colloidal silica (Table 1 #7) | 0 | 0 | 0 | 60 |

After heat processing, as in Example 1, solid shear reversible coating compositions were obtained.

EXAMPLE 15

A coating composition was prepared as in Example 3, but omitting the colloidal silica. To this preformed composition there was then added various colloidal silicas.

| | Parts by Weight | | | |
|---|---|---|---|---|
| Ingredient | 15A | 15B | 15C | 15D |
| Preformed composition | 2500 | 2500 | 2500 | 2500 |
| colloidal silica (Table 1 #4) | 161.9 | 0 | 0 | 0 |
| colloidal silica (Table 1 #10) | 0 | 161.9 | 0 | 0 |
| colloidal silica (Table 1 #9) | 0 | 0 | 161.9 | 0 |
| colloidal silica (Table 1 #8) | 0 | 0 | 0 | 161.9 |

After heat processing, as in Example 1, solid shear reversible coating compositions were obtained having the following Rotovisco data:

| | Spike | End |
|---|---|---|
| 15A | 22.5 | 8.0 |
| 15B | 10.5 | 6.5 |
| 15C | 13.5 | 7.0 |
| 15D | 17.0 | 8.0 |

Various other ingredients described hereinabove and varying amounts of the ingredients as set forth hereinabove may be employed in place of the exemplified ingredients to obtain equivalent results. Likewise, the various exemplified procedures may be varied in practice.

The term "stable" is employed throughout the disclosure and claims to describe the semi-solid or solid coating compositions of the invention. The gelling system components are employed so as to obtain the desired Spike and end point values upon substantially complete interaction of the colloid and the electrolyte present. Some drift in these values is typical with time, but "stable" as employed herein connotes that, even should these values moderately drift with time, the coating compositions of the invention have a usuable commercial shelf life during which the semi-solid or solid can be reduced to acceptable transfer and application viscosities by the application of a relatively small shearing force at a relatively small shearing rate, such as provided by a person employing a painting implement, for example, a pad applicator, to an acceptable ordinary painting viscosity.

Accordingly to the processions of the Patent Statues, there is described above the invention and what are now considered its best embodiments. However, within the scope of the appended claims, it is to be understood that the invention may be practiced otherwise than as specifically described.

What is claimed is:

1. A gelled coating composition, capable of application and flow on a solid substrate, comprising:
   (a) a water reducible, film-forming polymer,
   (b) water,
   (c) an electrolyte, and
   (d) a colloidal gelling agent, gelable by interaction with said electrolyte, in an amount sufficient, when substantially interacted with said electrolyte, to gel the composition to form a stable semi-solid or solid and to provide a composition reducible to a coating application viscosity upon the application of a relatively small shearing force, at a relatively small shearing rate,
   (e) which gelled coating composition, after being sheared to a coating application viscosity, does not recover substantial colloidal gelling agent-electrolyte contributed gel structure.

2. A composition, as in claim 1, where the electrolyte is a polyfunctional salt.

3. A composition, as in claim 1, where the colloidal gelling agent is an anionic silica sol.

4. A composition, as in claim 3, where the electrolyte is a polyfunctional salt.

5. A gelled coating composition capable of application and flow on a solid substrate, comprising:
   (a) a water reducible film-forming polymer which is an electrolyte,
   (b) water,
   (c) a colloidal gelling agent, gelable by interaction with said electrolyte, in an amount sufficient, when substantially interacted with said electrolyte, to gel the composition to form a stable semi-solid or solid and to provide a composition reducible to a coating application viscosity upon application of a relatively small shearing force, at a relatively small shearing rate,
   (d) which gelled coating composition, after being sheared to a coating application viscosity, does not recover substantial colloidal gelling agent-electrolyte contributed gel structure.

6. A composition, as in claim 5, where the polymeric electrolyte is a salt.

7. A composition, as in claim 5, where the colloidal gelling agent is an anionic silica sol.

8. A composition, as in claim 7, where the polymeric electrolyte is a salt.

9. A composition, as in claims 1 or 5, containing a water insoluble solvent which is not a solvent for the film forming polymer and whose presence contributes increased hiding by the creation of microvoids in a dried film produced from said composition.

10. A composition, as in claims 1 or 5, containing pigment particles.

11. A composition, as in claims 1 or 5, containing dispersed pigment particles carrying a charge.

12. A composition, as in claims 1 or 5, containing polymeric particles carrying a charge.

13. A method of forming a gelled coating composition capable of application and flow on a solid substrate, which coating composition, after being sheared to a coating application viscosity, does not recover substantial colloidal gelling agent-electrolyte contributed gel structure, which method comprises admixing with a preformed water-based coating composition: an electrolyte, and a colloidal gelling agent, gelable by interaction with said electrolyte in an amount sufficient, when substantially interacted with said electrolyte, to gel the composition to form a stable semi-solid or solid, and to provide a composition reducible to a coating application viscosity upon the application of a relatively small shearing force, at a relatively small shearing rate.

14. A method, as in claim 13, wherein the composition is heated at a temperature and for a time sufficient to cause the substantial completion of the interaction between the electrolyte and colloid.

15. A method of forming a gelled coating composition capable of application and flow on a solid substrate, which coating composition, after being sheared to a coating application viscosity, does not recover substantial colloidal gelling agent-electrolyte contributed gel structure, which method comprises admixing with a preformed water-based coating composition, containing an electrolyte: a colloidal gelling agent, gelable by interaction with said electrolyte, in an amount sufficient, when substantially interacted with said electrolyte, to gel the composition to form a viscosity stable semi-solid or solid, and to provide a composition reducible to a coating application viscosity upon the application of a relatively small shearing force, at a relatively small shearing rate.

16. A method, as in claim 15, wherein the composition is heated at a temperature and for a time sufficient to cause the substantial completion of the interaction between the electrolyte and colloid.

17. A method of forming a gelled coating composition capable of application and flow on a solid substrate, which coating composition, after being sheared to a coating viscosity, does not recover substantial colloidal gelling agent-electrolyte contributed gel structure, which method comprising admixing with a water-based coating composition during the formulation of its ingredients: an electrolyte, and a colloidal gelling agent, gelable by interaction with said electrolyte, in an amount sufficient, when substantially interacted with said electrolyte, to gel the composition to form a stable semi-solid or solid and to provide a composition reducible to a coating application viscosity upon the application of a relatively small shearing force, at a relatively small shearing rate.

18. A method, as in claim 17, wherein the composition is heated at a temperature and for a time sufficient to cause the substantial completion of the interaction between the electrolyte and colloid.

19. A method of forming a gelled coating composition capable of application and flow on a solid substrate, which coating composition, after being sheared to a coating viscosity, does not recover substantial colloidal gelling agent-electrolyte contributed gel structure, which method comprises admixing with a water-based coating composition, comprising a film-forming polymeric electrolyte, during the formulation of its ingredients: a colloidal gelling agent, gelable by interaction with said electrolyte, in an amount sufficient, when substantially interacted with said electrolyte, to gel the composition to form a stable semi-solid or solid and to provide a composition reducible to a coating application viscosity upon the application of a relatively small shearing force, at a relatively small shearing rate.

20. A method, as in claim 18, where the composition is heated at a temperature and for a time sufficient to cause the substantial completion of the interaction between the electrolyte and colloid.

21. A method as in claims 13, 14, 15, 16, 17, 18, 19 or 20 wherein a gel structure is formed after the composition is placed in a container.

22. A method as in claims 13, 14, 15, 16, 17, 18, 19 or 20 wherein a thin polymeric film is placed upon the surface of the coating composition.

23. A method as in claims 13, 14, 15, 16, 17, 18, 19 or 20 wherein the resultant gel is cut and placed into a container.

* * * * *